US012728446B2

(12) United States Patent
Velazquez

(10) Patent No.: US 12,728,446 B2
(45) Date of Patent: Sep. 8, 2026

(54) FLUID VAPOR MIXING AND DELIVERY SYSTEM

(71) Applicant: Applied Materials, Inc., Santa Clara, CA (US)

(72) Inventor: Edwin Velazquez, Union City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 767 days.

(21) Appl. No.: 17/949,091

(22) Filed: Sep. 20, 2022

(65) Prior Publication Data

US 2024/0091823 A1 Mar. 21, 2024

(51) Int. Cl.
*B08B 3/10* (2006.01)
*B08B 5/00* (2006.01)
*H01L 21/67* (2006.01)

(52) U.S. Cl.
CPC ........ *B08B 3/106* (2013.01); *B08B 2203/007* (2013.01)

(58) Field of Classification Search
CPC ........... B08B 3/102; B08B 3/106; B08B 5/00; H01L 21/67057; H01L 21/67028
USPC ................................ 34/404, 427; 134/102.3
See application file for complete search history.

(56) References Cited

U.S. PATENT DOCUMENTS 6,219,936 B1 * 4/2001 Kedo .................. H10P 72/0406 34/79
7,506,457 B2 * 3/2009 Aihara ................ H10P 72/0406 34/526
7,871,249 B2 1/2011 Urquhart et al.
2002/0061647 A1 * 5/2002 Kawamoto ....... H01L 21/02052 257/E21.228
2014/0290577 A1 * 10/2014 Nakajima ............... C23C 16/52 34/427
2018/0238621 A1 8/2018 Hanawa et al.
2019/0304778 A1 * 10/2019 Yamamoto ........ H01L 21/02337

FOREIGN PATENT DOCUMENTS

CN 1322936 C 6/2007
CN 102299051 A 12/2011
JP H11-330039 A 11/1999
(Continued)

OTHER PUBLICATIONS

English JP2014130940 by PE2E Jul. 7, 2025.*
(Continued)

*Primary Examiner* — Deming Wan
(74) *Attorney, Agent, or Firm* — Patterson + Sheridan, LLP

(57) ABSTRACT

A method and apparatus for delivering IPA vapor to a substrate processing chamber. In one aspect, the invention includes a controller, a liquid mass flow controller (LMFC) associated with a vaporizer to convert a first fluid to a vapor, a mass flow controller (MFC) associated with the carrier gas, a mixing unit to mix the vapor with the carrier gas to create the predetermined mixture and a drain circuit including a first flow path having a first valve between the mixing unit and a drain, a second flow path having a second valve between the mixing unit and the processing chamber, whereby the first flow path can be opened until the predetermined mixture is reached and thereafter, the second flow path can be opened allowing the predetermined mixture to be delivered to the chamber.

16 Claims, 4 Drawing Sheets

(56) References Cited

FOREIGN PATENT DOCUMENTS

| | | | | | |
|---|---|---|---|---|---|
| JP | 200414822 | A | | 1/2004 | |
| JP | 2005142558 | A | | 6/2005 | |
| JP | 2014130940 | A | * | 7/2014 | ....... H01L 21/67248 |
| JP | 2016157709 | A | | 9/2016 | |
| JP | 2022103812 | A | | 7/2022 | |
| KR | 20030000589 | A | | 1/2003 | |
| KR | 20050040381 | A | | 5/2005 | |
| KR | 20070118485 | A | | 12/2007 | |
| KR | 10-2018-0044931 | A | | 5/2018 | |
| TW | 201638542 | A | | 11/2016 | |

OTHER PUBLICATIONS

International Search Report and Written Opinion for PCT/US2023/030338 dated Dec. 4, 2023.
Office Action from South Korean Patent Application No. 10-2025-7012411 dated Mar. 13, 2026.
Office Action in related matter TW 112131301 dated Aug. 22, 2025.
Notice of Reasons for Rejection from JP Application No. 2025-515930 dated Jun. 23, 2026.

* cited by examiner

FLUID VAPOR MIXING AND DELIVERY SYSTEM

BACKGROUND

Field

Embodiments described herein generally relate to equipment used in the manufacturing of electronic devices, and more particularly, to a substrate processing system which may be used to clean the surface of a substrate.

Description of the Related Art

One of the most important tasks in semiconductor industry is the cleaning and preparation of the silicon surface for further processing. The main goal is to remove contaminants such as particles from the wafer surface and to control chemically grown oxide on the wafer surface. Modern integrated electronics would not be possible without the development of technologies for cleaning and contamination control, and further reduction of the contamination level of the silicon wafer is mandatory for the further reduction of the IC element dimensions. Wafer cleaning is the most frequently repeated operation in IC manufacturing and is one of the most important segments in the semiconductor equipment business, and it looks as if it will remain that way for some time. Each time device-feature sizes shrink or new tools and materials enter the fabrication process, the task of cleaning gets more complicated.

Most cleaning methods can be loosely divided into two big groups: wet and dry methods. Liquid chemical cleaning processes are generally referred to as wet cleaning. They rely on combination of solvents, acids and water to spray, scrub, etch and dissolve contaminants from the wafer surface. Dry cleaning processes use gas phase chemistry, and rely on chemical reactions required for wafer cleaning, as well as other techniques such as laser, aerosols and ozonated chemistries.

For wet-chemical cleaning methods, the RCA clean, developed in 1965, still forms the basis for most front-end wet cleans. A typical RCA-type cleaning sequence starts with the use of an $H_2SO_4/H_2O_2$ solution followed by a dip in diluted HF (hydrofluoric acid). A Standard Clean first operation (SCI) can use a solution of $NH_4OH/H_2O_2/H_2O$ to remove particles, while a Standard Clean second operation (SC2) can use a solution of $HCl/H_2O_2/H_2O$ to remove metals. Despite increasingly stringent process demands and orders-of-magnitude improvements in analytical techniques, cleanliness of chemicals, and DI water, the basic cleaning recipes have remained unchanged since the first introduction of this cleaning technology. Since environmental concerns and cost-effectiveness were not a major issue 30 years ago, the RCA cleaning procedure is far from optimal in these respects.

Marangoni drying is a commonly used method to dry wafers after being processed in a wet bench. The method uses a difference in surface tension gradients of IPA and DI water to help remove water from the surface of the wafer. This surface tension phenomenon is known as the Marangoni effect. The Marangoni effect is characterized in thin liquid films and foams whereby stretching an interface causes the surface excess surfactant concentration to decrease, hence surface tension to increase; the surface tension gradient thus created causes liquid to flow toward the stretched region, thus providing both a "healing" force and also a resisting force against further thinning.

In a Marangoni drying operation described above, IPA vapor is combined with a carrier gas like $N_2$ and then delivered through a nozzle to the surface of a substrate. In most conventional designs, the IPA vapor generated in a refillable vessel is stored in the box within a processing system. As the demand for substrate drying increases, multiple fluid boxes, each having its own vessel are needed to accommodate multiple chambers that are adapted to perform the Marangoni drying process. Because of their size, having a separate vessel for each box is an inefficient use of space and also requires additional time as each vessel needs to be filled and refilled regularly.

Another challenge related to surface drying using the forgoing methods relates to the ability to deliver a consistent concentration of IPA vapor in a carrier gas to a surface of a substrate by IPA mixture dispensing components during the beginning, middle and end of the Marangoni drying process. In one example, it can take a matter of seconds before a desired concentration is reached at the start of a Marangoni drying process due to the non-steady flow experienced at the IPA mixture dispensing components during the initial stages of the drying process. The result can lead to drying related defects or contamination of the surface of a substrate brought about by the incorrect flowrate and mixture of the IPA vapor and carrier gas provided to a surface of the substrate. Moreover, in a Marangoni-type dryer, it is desirable for the throughput of substrates through a process chamber to be constant and a delay in the Marangoni process to allow for a stabilization of the IPA mixture creates substrate throughput issues.

There is a need therefore for a more efficient fluid delivery system requiring a smaller footprint while servicing a number of chambers.

There is a further need for a drying apparatus that permits a constant throughput of substrates while insuring a proper concentration of fluids throughout the drying cycles.

SUMMARY

The present disclosure generally describes apparatus and methods for delivering IPA vapor to a substrate processing chamber. In one aspect, the invention includes a controller, a liquid mass flow controller (LMFC) associated with a vaporizer to convert fluid IPA to IPA vapor, a mass flow controller (MFC) associated with the carrier gas, a mixing unit to mix the IPA vapor with the carrier gas to create the predetermined mixture and a drain circuit including a first flow path having a first valve between the mixing unit and a drain, a second flow path having a second valve between the mixing unit and the processing chamber, whereby the first flow path can be opened until the predetermined mixture is reached and thereafter, the second flow path can be opened allowing the predetermined mixture to be delivered to the chamber.

In another embodiment, a fluid box assembly comprises a controller, a first box having an IPA vessel for containment of liquid IPA, the liquid IPA pressurized for delivery via a first fluid path to a first liquid mass flow controller (LMFC) associated with a first vaporizer to convert fluid IPA to IPA vapor, a first mass flow controller (MFC) associated with a carrier gas, a first mixing unit to mix the IPA gas with the carrier gas to create the predetermined mixture for delivery to a first processing chamber, a second box, the second box having a second LMFC associated with a second vaporizer to convert fluid IPA to IPA vapor, a second MFC controller associated with a carrier gas, a second mixing unit to mix the IPA vapor with the carrier gas to create the predetermined mixture for delivery to a second processing chamber; and a second fluid path between the IPA vessel and the second box.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
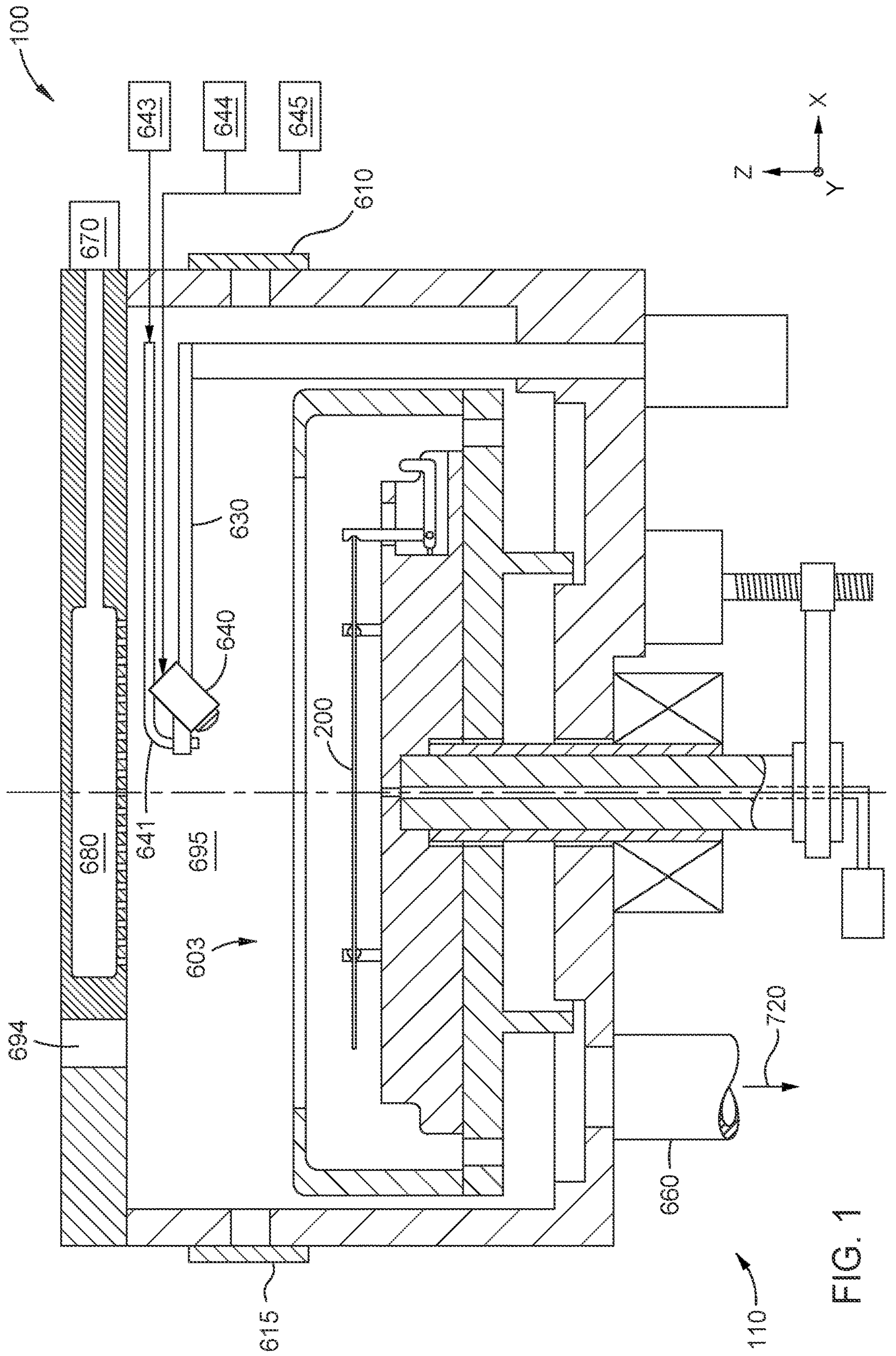
FIG. 1 is a cross sectional view of a cleaning chamber in a CMP processing system, according to one or more embodiments.

FIG. 1 is a cross sectional view of a cleaning chamber in a chemical mechanical polishing (CMP) processing system, according to one or more embodiments. Typically, the ICD chamber 110 may be utilized to remove contamination from a substrate 200 that, if not removed, may lead to a corresponding substrate 200 not meeting cleanliness requirements for subsequent processing steps and being discarded. In one example, the ICD chamber 110 is configured to perform a cleaning and drying process that prevents the formation of water droplet marks on a surface of the substrate 200. In the embodiment shown, substrates are introduced into the chamber 110 via an entry door 610 on one side of the chamber and after cleaning, the substrate exists an exit door 615 on an opposite side. In general, the processes performed in each ICD chamber 110 are the last cleaning processes performed in a cleaning sequence performed on the substrate in the CMP system 100. The processes performed in each ICD chamber 110 can include one or more cleaning steps in which a cleaning fluid or rinsing fluid (e.g., DI water) is supplied to the top side and/or bottom side of the substrate and then a drying process is performed on the substrate.

The ICD chamber 110 includes a substrate gripping device 603, sweep arm 630, first nozzle mechanism 640, second nozzle mechanism 641, plenum 680, drain/exhaust 660, and gas source 670. The ICD chamber 110 may further include a sensing device 694, such as a camera to detect the state of the cleaning process or retroreflective position sensing device to sense the position of the substrate within the interior volume 695.

One or more fluids may be applied to the processing side of the substrate 200 by the first nozzle mechanism 640 and a second nozzle mechanism 641. For example, a first fluid supply 643 may supply de-ionized water, an inert gas and/or IPA vapor to the second nozzle mechanism 641 that is positioned to deliver the fluid to a surface of the substrate 200, and the first nozzle mechanism 640 may apply de-ionized (DI) water to the processing side of the substrate 200. As will be further disclosed herein, the IPA vapor is provided from an IPA vapor delivery assembly that can include an IPA vapor generation source 644 and a carrier gas delivery source 645. The IPA vapor generation source 644 can include an IPA liquid vaporizing device (not shown) that is configured to receive liquid IPA and convert it into a vapor, which is then mixed with a carrier gas (e.g., $N_2$) provided from the carrier gas delivery source 645, and then provided to the surface of the substrate during the Marangoni drying process.

During processing once the substrate 200 is placed onto the brackets of the substrate gripping device 603, the brackets can be lowered to a process position as shown in FIG. 1. In one embodiment, as shown in FIG. 1, the first nozzle mechanism 640 and the second nozzle mechanism 641 can be positioned to each direct a flow of a gas, vapor, or a liquid onto the top surface of the substrate 200. The second nozzle mechanism 641 can flow one or more cleaning solutions such as are used in the RCA cleaning processes to contact the substrate 200 at a first location over the surface of the substrate (e.g., substrate center) during processing. The second nozzle mechanism 641 can also be used in a rinse cycle, to flow an IPA mixture, or some other surface tension reducing chemical, onto the top surface of the substrate at a second location. The distance between the first nozzle mechanism 640 and the second nozzle mechanism 641, edge-to-edge, can be positioned such that the streams from the first nozzle mechanism 640 and the second nozzle mechanism 641 can be separated by a desired distance. The IPA mixture can be created, as described further below, prior to entering the process chamber 100. The first nozzle mechanism 640 and the second nozzle mechanism 641 can be capable of moving such as, for example, by pivot or by linear translation across the surface of the substrate. During a drying process, while the first nozzle mechanism 640 and the second nozzle mechanism 641 are being translated, a first fluid (e.g., DI water) can be dispensed from the first nozzle mechanism 640 while an IPA mixture is provided from the second nozzle mechanism 641 to thus perform a Marangoni drying process. Moving the first nozzle mechanism 640 and the second nozzle mechanism 641 can move the contact points (first location and second location respectively) for the fluids from the substrate center toward the substrate edge. The first nozzle mechanism 640 and the second nozzle mechanism 641 can be attached to each other to move in unison or the first nozzle mechanism 640 and the second nozzle mechanism 641 can move independently.

The air flow provided to the ICD chambers 110 can be provided at a desired pressure and flow rate to assure the removal of vapors (e.g., IPA vapor) and/or airborne particles and the like formed within the processing region of the ICD chambers 110 during processing. In some embodiments in which nitrogen gas is delivered into the ICD chambers 110, it may be desirable to eliminate the use of a HEPA filter from the system to reduce system and maintenance costs and reduce system complexity. In some embodiments, the gas source 670 is configured to provide filtered air or other gas so that a desired pressure (e.g., greater than atmospheric pressure) is maintained in the processing region of the ICD chamber.

Figure 2:
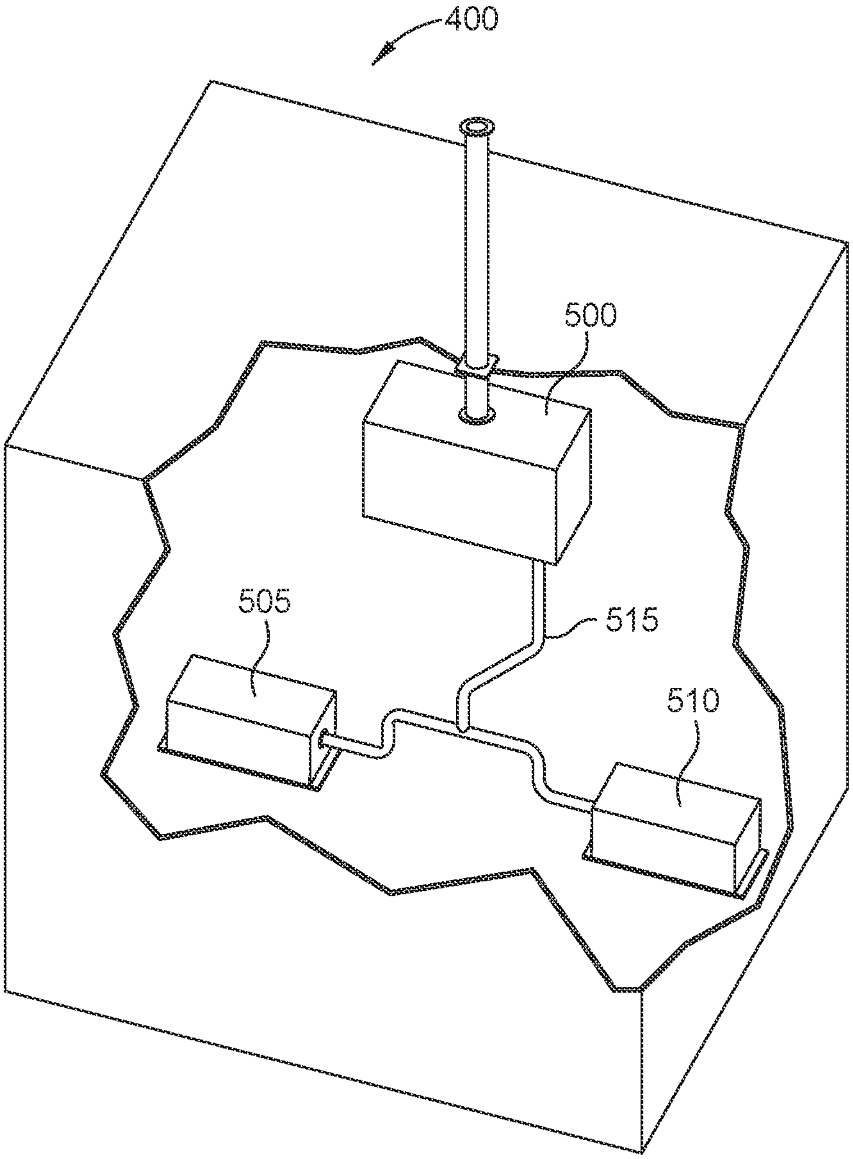
FIG. 2 is a simplified drawing showing a gas delivery system according to one aspect of the invention.

FIG. 2 is a simplified drawing showing a fluid delivery system according to one aspect of the invention. The system includes an enclosure 400 housing a vented, main fluid box 500 and two remote fluid boxes 505, 510 with a fluid path 515 running between the boxes. As will be described in more detail herein, the fluid path 515 serves to transport liquid IPA from an IPA vessel (not shown) in the main fluid box to the remote fluid boxes. The fluid boxes 500, 505, 510 serve to mix fluids, in this case IPA vapor and $N_2$ gas prior to delivery of a predetermined mixture to a processing chamber 110 like the one shown and described in relation to FIG. 1. FIG. 2 is intended to facilitate the understanding of the placement of the fluid boxes 500, 505, 510 and the movement of liquid IPA within the enclosure 400 and does not include that part of the apparatus that actually mixes and delivers the gas to a chamber.

Figure 3:
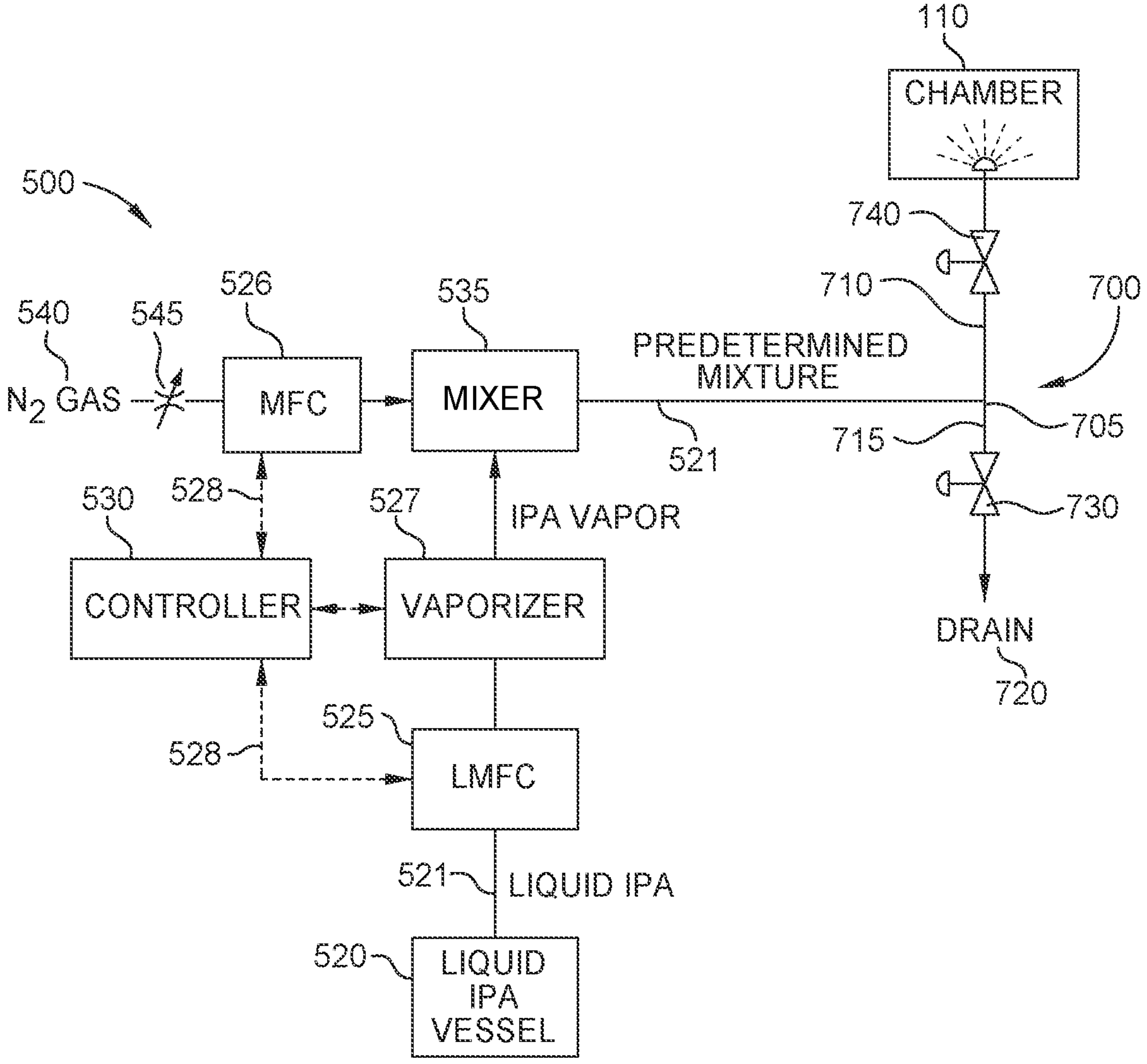
FIG. 3 is a schematic view of the components of a main fluid box according to one aspect of the invention.

FIG. 3 is a schematic view of the components of the main fluid box 500 according to one aspect of the invention. The components include a vessel 520 containing liquid IPA that is typically pressurized with an inert gas like $N_2$ to urge the liquid from the vessel along a flow line 521 towards a liquid mass flow controller (LMFC) 525 that is used to automatically control the flow rate of a liquid according to a set flow rate command sent as an electric signal from a system controller 530, without being affected by pressure conditions of the liquid. The system controller 530 includes a programmable central processing unit (CPU) and is in communication with a number of components of the fluid box 500, including LMFC 525, a mass flow controller (MFC) 526 and a vaporizer unit 527 for converting the IPA fluid into IPA vapor. Dotted lines 528 between the controller and other components illustrate the communication paths and relationship between the components.

From the LMFC 525, the liquid IPA, in its predetermined flow rate is pushed through flow line 521 to vaporizer unit 527 that serves to vaporize the liquid IPA and delivers vaporized IPA to a mixer 535. Separately, a source of $N_2$ gas 540 controlled by a gas valve 545 (e.g., pressure regulator) enters its own MFC 526 which, and by use of the system controller 530 automatically controls the flow rate of $N_2$ gas according to a predetermined setting. The predetermined flow rates of IPA vapor and $N_2$ gas then enter the gas/vapor mixer 535. Once the IPA vapor is mixed with the nitrogen gas in the mixer, the predetermined mixture travels along flow line 521 towards the chamber 110.

Also shown in FIG. 3 is a drain circuit 700 that includes a "T" junction 705 with a first flow path 710 leading to the chamber 110 and a separate flow path 715 leading to a drain 720 (also visible in FIG. 1). In each case, there is an automated control valve 730, 740 operable by the controller 530 to open and close the paths 715, 710 to the drain 720 and chamber 110 respectively. The drain circuit 700 is constructed and arranged to ensure the flow rate and concentration of process gas (IPA vapor and $N_2$ gas) in the mixture is at or near the desired rate and/or predetermined mixture when introduced into the chamber for delivery onto a surface of a substrate 200 via nozzle 640. In one aspect of the invention, chamber valve 740 is initially closed and drain valve 730 is opened permitting the predetermined mixture of IPA vapor and $N_2$ gas to flow through flow path 715 to the drain 720. Once the flow has "ramped-up" or reached its desired flow rate, or steady state, the drain valve 730 is closed and the chamber valve 740 is opened, thereby avoiding subjecting the nozzle 640 and with it the substrate 200 to an inaccurate flow rate or mixture that can create drying-related defects or contamination in the substrate as it is being processed. In some cases, the inaccurate flow rate or mixture can include an initial burst of the mixture of IPA vapor and $N_2$ gas onto to the surface of the substrate 200 which has been found to create particles and other related defects on the surface of the substrate. In one embodiment, once the preferred flow rate is established, the drain valve 720 is closed and the chamber valve 740 is simultaneously opened. In another embodiment, there is a delay between the closing of the drain valve 720 and the opening of the chamber valve 740. In yet another embodiment, the drain valve 720 is closed at a predetermined rate or closed to a certain point while the chamber valve 740 is opened at the same rate in an opposite fashion. In another embodiment, the drain valve 730 is opened as a substrate is introduced into the chamber 110 via entry door 610 (FIG. 1) in order to have the mixture at the correct flow when the substrate reaches its processing position, after which the drain valve is closed, the chamber valve 740 is opened and the mixture with the preferred flow/mixture characteristics is provided to the nozzle 640. Once the substrate has been treated and is moved towards the exit door 615, the chamber valve 740 is closed and the drain valve 720 is re-opened. It will be understood that any number of timing arrangements regarding the open/closed positions of the valves 720, 740 are possible depending on aspects of a particular process including throughput requirements of substrates in a chamber.

Figure 4:
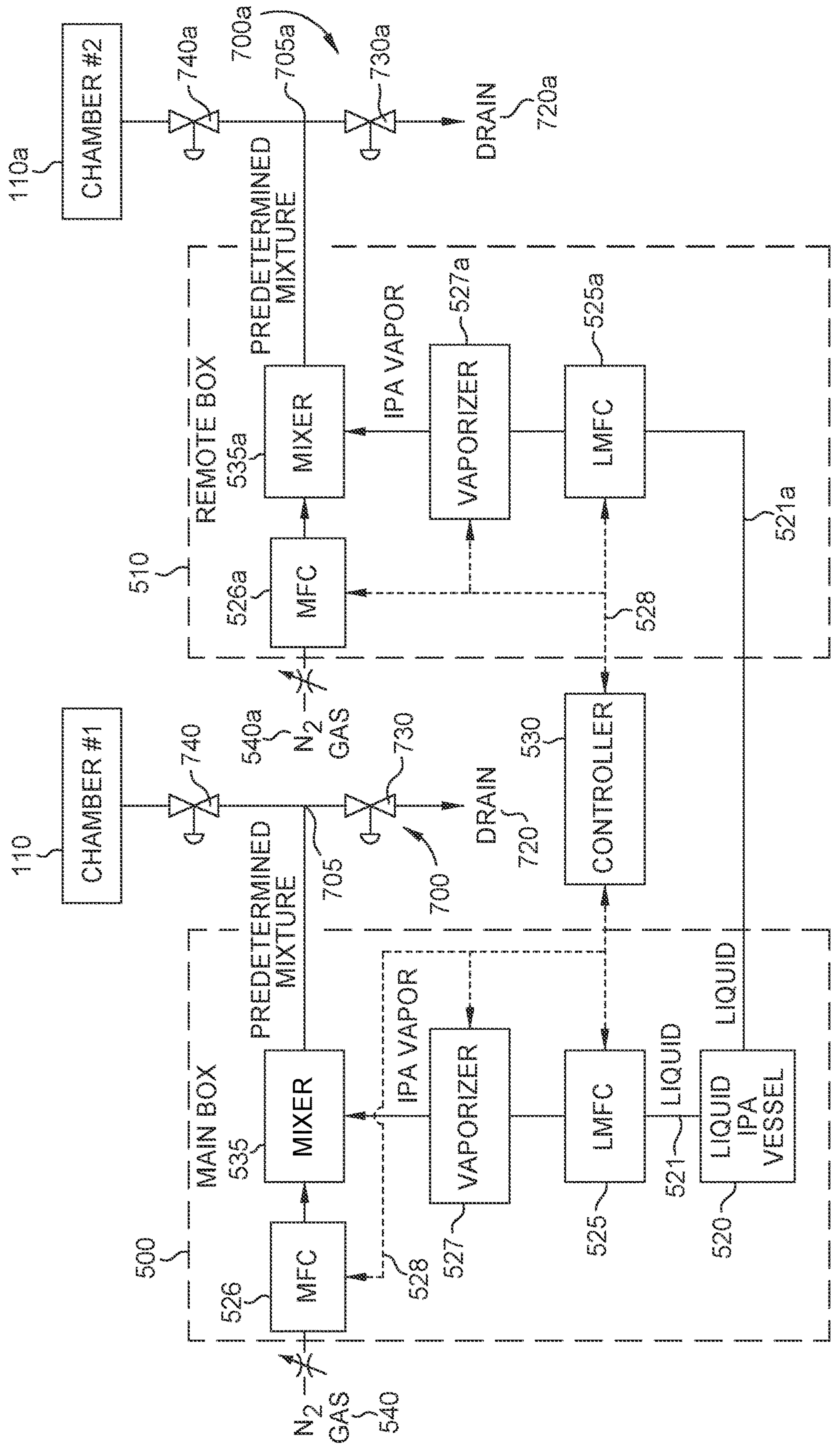
FIG. 4 is a schematic view of an aspect of the invention showing a main fluid box and a remote fluid box.

FIG. 4 is a schematic view of an aspect of the invention showing the main fluid box 500 and a remote fluid box 510. FIG. 4 is intended to illustrate the use of multiple fluid boxes, all relying on a single liquid IPA vessel 520 in order to reduce the footprint of an enclosure having any number of fluid boxes, each of which provides a predetermined fluid mixture to an assigned chamber 110, 110*a*. While only one remote box 510 is included in FIG. 4, it will be understood that any number of remote fluid boxes can operate according to aspects of the invention, limited only by the number of associated chambers in the fabrication facility and the capacity of the single IPA vessel 520 in the main fluid box 500. In one aspect, the IPA vessel 520 is provided with fluid level sensors (not shown) and the liquid IPA in the vessel is automatically kept at a predetermined level adequate to provide liquid to all of the IPA mixing components in the fluid boxes. As shown in FIG. 2, the remote fluid boxes, due to the absence of an IPA vessel are physically smaller than the main fluid box, thereby saving precious room and reducing the footprint of an enclosure 400. As illustrated, the remote box 510 includes all the components of the main fluid box except for a liquid IPA vessel. Components of the remote fluid box include a source of $N_2$ carrier gas 540*a*, an MFC 526*a* for the $N_2$ gas, an LMFC 525*a* for the liquid IPA as well as an IPA vaporizer 527*a* and a mixing unit 535*a*. Also included is a drain circuit 700*a* like the one 700 described in relation to FIG. 3. A second fluid flow path 521*a* is provided from the IPA vessel 520 in the main fluid box 500 to the LMFC 525*a* in remote fluid box 510. In the embodiment shown, both boxes 500, 510 rely on a single controller 530.

The drain circuits 700, 700*a* shown and described herein are especially advantageous in processes requiring an almost constant throughput of substrates. In one example, a substrate is delivered to a chamber for a process and then immediately moved to a drying chamber. Any delay while the predetermined gas/vapor mixture ramps-up would likely result in defects to the substrate. Once the predetermined mixture of vapor and carrier gas is attained in the drain circuits, it can be maintained by keeping the vent valve open whenever the chamber valve is closed as a completed substrate is robotically removed from the chamber and the next substrate is placed in the chamber.

While the foregoing is directed to embodiments of the present disclosure, other and further embodiments of the disclosure may be devised without departing from the basic scope thereof, and the scope thereof is determined by the claims that follow.

The invention claimed is:

1. An apparatus for delivering a predetermined mixture of fluids to a substrate in a processing chamber, comprising:

a controller;

a liquid mass flow controller associated with a vaporizer configured to convert a first liquid to a vapor;

a mass flow controller associated with a source of a carrier gas;

a mixing unit configured to mix the vapor with the carrier gas to create the predetermined mixture;

a drain circuit including:

a first flow path having a first valve between the mixing unit and a drain; and a second flow path having a second valve between the mixing unit and the processing chamber, wherein the controller controls the liquid mass flow controller, the mass flow controller, and the vaporizer, to create the predetermined mixture, and wherein the controller causes the predetermined mixture to be provided through the first flow path for at least a first period of time before allowing the predetermined mixture to be delivered to a surface of the substrate within the processing chamber.

2. The apparatus of claim 1, wherein the first liquid comprises isopropyl alcohol.

3. The apparatus of claim 2, wherein at the end of the first period of time, the controller causes the first valve of the first flow path to close as the second valve of the second flow path is opened.

4. The apparatus of claim 2, wherein at the end of the first period of time, the controller causes the first valve of the first flow path to close after the second valve of the second flow path is opened.

5. The apparatus of claim 2, wherein at the end of the first period of time, the controller causes the first valve of the first flow path to remain open after the second valve of the second flow path is opened.

6. The apparatus of claim 2, wherein at the end of the first period of time, the controller causes the first valve of the first flow path to close at a predetermined rate and the second valve of the second flow path to open at a substantially corresponding rate.

7. The apparatus of claim 1, wherein the controller causes the first flow path to open at a predetermined time relative to a first processing position of the substrate in the processing chamber.

8. The apparatus of claim 7, wherein the controller causes the second flow path to open at a predetermined time relative to a second processing position of the substrate in the processing chamber.

9. The apparatus of claim 8, whereby in the first processing position, the substrate is being introduced into the chamber.

10. The apparatus of claim 8, whereby the second processing position is a substrate processing position.

11. A fluid box assembly comprising:

a controller;

a first box, the first box having:

an isopropyl alcohol vessel for containment of liquid isopropyl alcohol, the liquid isopropyl alcohol pressurized for delivery via a first fluid path to a first liquid mass flow controller associated with a first vaporizer configured to convert fluid isopropyl alcohol to isopropyl alcohol vapor;

a first mass flow controller associated with a source of the first carrier gas; and a first mixing unit configured to mix the isopropyl alcohol gas with the first carrier gas to create a predetermined mixture for delivery to a first processing chamber;

a second box, the second box having:

a second liquid mass flow controller associated with a second vaporizer configured to convert fluid isopropyl alcohol to isopropyl alcohol vapor;

a second mass flow controller associated with the source of the carrier gas;

a second mixing unit configured to mix the isopropyl alcohol vapor with the carrier gas to create the predetermined mixture for delivery to a second processing chamber; and a second fluid path between the isopropyl alcohol vessel and the second box, wherein the controller controls the first and second liquid mass flow controllers, the first and second mass flow controllers and the first and second vaporizers.

12. The fluid box assembly of claim 11, wherein the first and second boxes are housed in an enclosure.

13. The fluid box assembly of claim 11, further including:

a third fluid box, the third box having:

a third liquid mass flow controller associated with a third vaporizer configured to convert fluid isopropyl alcohol to isopropyl alcohol vapor;

a third mass flow controller associated with the source of the carrier gas; and a third mixing unit configured to mix the isopropyl alcohol vapor with the carrier gas to create the predetermined mixture for delivery to a third processing chamber; and a third fluid path between the isopropyl alcohol vessel and the second box.

14. The fluid box assembly of claim 13, wherein the controller controls the third liquid mass flow controller, the third mass flow controller, and the third vaporizer.

15. The fluid box assembly of claim 13, wherein the second fluid path terminates at the second liquid mass flow controller and the third fluid path terminates at the third liquid mass flow controller.

16. A fluid box assembly comprising:

a controller;

a first box, the first box having:

a vessel for containment of liquid isopropyl alcohol, the liquid isopropyl alcohol pressurized for delivery via a first fluid path to a first liquid mass flow controller associated with a first vaporizer configured to convert fluid isopropyl alcohol to isopropyl alcohol vapor;

a first mass flow controller associated with a carrier gas;

a first mixing unit configured to mix the isopropyl alcohol gas with the carrier gas to create a predetermined mixture for delivery to a first processing chamber;

a second box, the second box having:

a second liquid mass flow controller associated with a second vaporizer configured to convert fluid isopropyl alcohol to isopropyl alcohol vapor;

a second mass flow controller associated with a carrier gas;

a second mixing unit configured to mix the isopropyl alcohol vapor with the carrier gas to create the predetermined mixture for delivery to a second processing chamber;

a second fluid path between the isopropyl alcohol vessel and the second liquid mass flow controller of the second box, wherein liquid isopropyl alcohol is pressurized for delivery from the isopropyl alcohol vessel to the second liquid mass flow controller;

a first drain circuit associated with the first processing chamber, including:

a first flow path having a first valve between the first mixing unit and a drain;

a second flow path having a second valve between the first mixing unit and the first processing chamber, whereby the controller opens the first flow path until the predetermined mixture is reached and thereafter, the controller opens the second flow path allowing the predetermined mixture to be delivered to the first chamber; and a second drain circuit associated with the second processing chamber, including:

a first flow path having a first valve between the second mixing unit and a drain;

a second flow path having a second valve between the second mixing unit and the second processing chamber, whereby the controller opens the first flow path until the predetermined mixture is reached and thereafter, the controller opens the second flow path allowing the predetermined mixture to be delivered to the second chamber wherein the controller controls the first and second liquid mass flow controllers, the first and second mass flow controllers and the first and second vaporizers.

* * * * *